United States Patent
Rigg et al.

(10) Patent No.: US 10,830,475 B2
(45) Date of Patent: Nov. 10, 2020

(54) SYSTEMS AND METHODS FOR THERMAL STORAGE IN A ZONING SYSTEM

(71) Applicant: Johnson Controls Technology Company, Auburn Hills, MI (US)

(72) Inventors: Brian D. Rigg, Douglass, KS (US); Shawn A. Hern, Derby, KS (US); Andrew M. Boyd, Wichita, KS (US); Noel A. Grajeda-Trevizo, Newton, KS (US); Cody J. Kaiser, Wichita, KS (US); Tom R. Tasker, Andover, KS (US); Theresa N. Gillette, Wichita, KS (US); Jonathan A. Burns, Wichita, KS (US); Tyler P. McCune, El Dorado, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 77 days.

(21) Appl. No.: 16/186,112

(22) Filed: Nov. 9, 2018

(65) Prior Publication Data

US 2020/0132324 A1    Apr. 30, 2020

Related U.S. Application Data

(60) Provisional application No. 62/752,217, filed on Oct. 29, 2018.

(51) Int. Cl.
| | | |
|---|---|---|
| *F24F 11/46* | (2018.01) | |
| *F24F 11/61* | (2018.01) | |
| *F24F 11/64* | (2018.01) | |
| *F24F 11/65* | (2018.01) | |
| *F24F 11/72* | (2018.01) | |
| *F24F 13/02* | (2006.01) | |

(Continued)

(52) U.S. Cl.
CPC .............. *F24F 11/46* (2018.01); *F24F 11/56* (2018.01); *F24F 11/61* (2018.01); *F24F 11/64* (2018.01); *F24F 11/65* (2018.01); *F24F 11/72* (2018.01); *F24F 13/02* (2013.01); *F24F 13/10* (2013.01); *G05B 15/02* (2013.01); *F24F 2110/10* (2018.01); *F24F 2110/12* (2018.01); *F24F 2120/12* (2018.01); *F24F 2120/20* (2018.01); *F24F 2130/10* (2018.01); *F24F 2140/50* (2018.01); *F24F 2140/60* (2018.01)

(58) Field of Classification Search
None
See application file for complete search history.

(56) References Cited

U.S. PATENT DOCUMENTS

| | | |
|---|---|---|
| 4,739,624 A | 4/1988 | Meckler |
| 5,005,368 A | 4/1991 | MacCracken et al. |

(Continued)

*Primary Examiner* — Ryan A Jarrett
(74) *Attorney, Agent, or Firm* — Fletcher Yoder, P.C.

(57) ABSTRACT

The present disclosure relates to a zoning system for climate control including a controller configured to operate the zoning system to supply conditioned air to a first zone of a plurality of zones through a first supply air damper to thermally charge the first zone. The controller is also configured to close the first supply air damper of the first zone and open a second supply air damper of a second zone of the plurality of zones after the first zone is thermally charged. The controller is further configured to operate the zoning system to draw the conditioned air from the first zone and supply the conditioned air to the second zone through the second supply air damper.

21 Claims, 10 Drawing Sheets

(51) Int. Cl.
*F24F 13/10* (2006.01)
*G05B 15/02* (2006.01)
*F24F 11/56* (2018.01)
*F24F 140/60* (2018.01)
*F24F 110/10* (2018.01)
*F24F 110/12* (2018.01)
*F24F 120/12* (2018.01)
*F24F 120/20* (2018.01)
*F24F 130/10* (2018.01)
*F24F 140/50* (2018.01)

(56) References Cited

U.S. PATENT DOCUMENTS

| | | |
|---|---|---|
| 7,156,316 B2 | 1/2007 | Kates |
| 8,378,835 B2 | 2/2013 | Shin et al. |
| 9,945,588 B2 | 4/2018 | Diamond et al. |
| 10,330,328 B2 * | 6/2019 | Land, III ................ F24F 3/044 |
| 10,359,202 B1 * | 7/2019 | Prather ................... F24F 5/001 |
| 10,436,471 B2 * | 10/2019 | Williams ................ F26B 21/12 |
| 2016/0061469 A1 | 3/2016 | Albonesi et al. |
| 2016/0282002 A1 | 9/2016 | Upshaw et al. |
| 2019/0145642 A1 * | 5/2019 | Heigl ................... F24F 11/0001 454/239 |
| 2019/0195528 A1 * | 6/2019 | Puranen ................... F24F 11/74 |
| 2019/0257545 A1 * | 8/2019 | Ko ........................... F24F 11/33 |
| 2019/0338979 A1 * | 11/2019 | Ray ......................... F24F 11/30 |
| 2020/0049367 A1 * | 2/2020 | Funada ................ F24F 13/085 |

* cited by examiner

SYSTEMS AND METHODS FOR THERMAL STORAGE IN A ZONING SYSTEM

CROSS-REFERENCE TO RELATED APPLICATIONS

This application claims priority from and the benefit of U.S. Provisional Application Ser. No. 62/752,217, entitled "SYSTEMS AND METHODS FOR THERMAL STORAGE IN A ZONING SYSTEM," filed Oct. 29, 2018, which is herein incorporated by reference in its entirety for all purposes.

BACKGROUND

This disclosure relates generally to heating, ventilation, and/or air conditioning (HVAC) systems. Specifically, the present disclosure relates to a thermal storage system for a zoned HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to control certain environmental conditions, such as temperature, within a building, home, or other structure. A zoned HVAC system generally includes dampers disposed within ductwork forming an air distribution system of a building. The dampers cooperate to regulate air flow within the ductwork and redirect air to specific areas or zones of the building based on a cooling demand of the zones. Accordingly, the dampers facilitate the designation of customized temperature zones throughout the building. That is, the zoned HVAC system may deliver suitably conditioned air to particular zones of the building in order to adequately meet and/or approach a demand for conditioned air in these zones. Unfortunately, conventional zoned HVAC systems often operate throughout inopportune time periods where an operational efficiency of the zoned HVAC system is reduced, thereby increasing an operating cost of the zoned HVAC system.

SUMMARY

The present disclosure relates to a zoning system for climate control including a controller configured to operate the zoning system to supply conditioned air to a first zone of a plurality of zones through a first supply air damper to thermally charge the first zone. The controller is also configured to close the first supply air damper of the first zone and open a second supply air damper of a second zone of the plurality of zones after the first zone is thermally charged. The controller is further configured to operate the zoning system to draw the conditioned air from the first zone and supply the conditioned air to the second zone through the second supply air damper.

The present disclosure also relates to a zoning system for climate control including a controller configured to operate the zoning system while within a first designated time to supply conditioned air through a first supply air damper of a first zone of a plurality of zones to thermally charge the first zone. The controller is also configured to open a first return air damper of the first zone and open a second supply air damper of a second zone of the plurality of zones while within a second designated time subsequent to the first designated time. The controller is further configured to operate the zoning system to draw the conditioned air through the first return air damper of the first zone and supply the conditioned air to the second zone through the second supply air damper.

The present disclosure also relates to a heating, ventilation, and/or air conditioning (HVAC) system including a zoning system configured to control the HVAC system to condition spaces within a building having a plurality of zones, where the zoning system has a controller configured to open a first damper and a second damper of a first zone of the plurality of zones while within a first designated time period and operate the zoning system to supply conditioned air to the first zone through the first damper to thermally charge the first zone while within the first designated time period. The controller is also configured to open a third damper of a second zone of the plurality of zones while within a second designated time period and after the first designated time period and operate the zoning system while within the second designated time period to draw the conditioned air from the first zone through the first damper or the second damper to thermally discharge the first zone and to supply the conditioned air to the second zone through the third damper to condition the second zone.

BRIEF DESCRIPTION OF THE DRAWINGS

Various aspects of this disclosure may be better understood upon reading the following detailed description and upon reference to the drawings in which.

DETAILED DESCRIPTION

Figure 1:
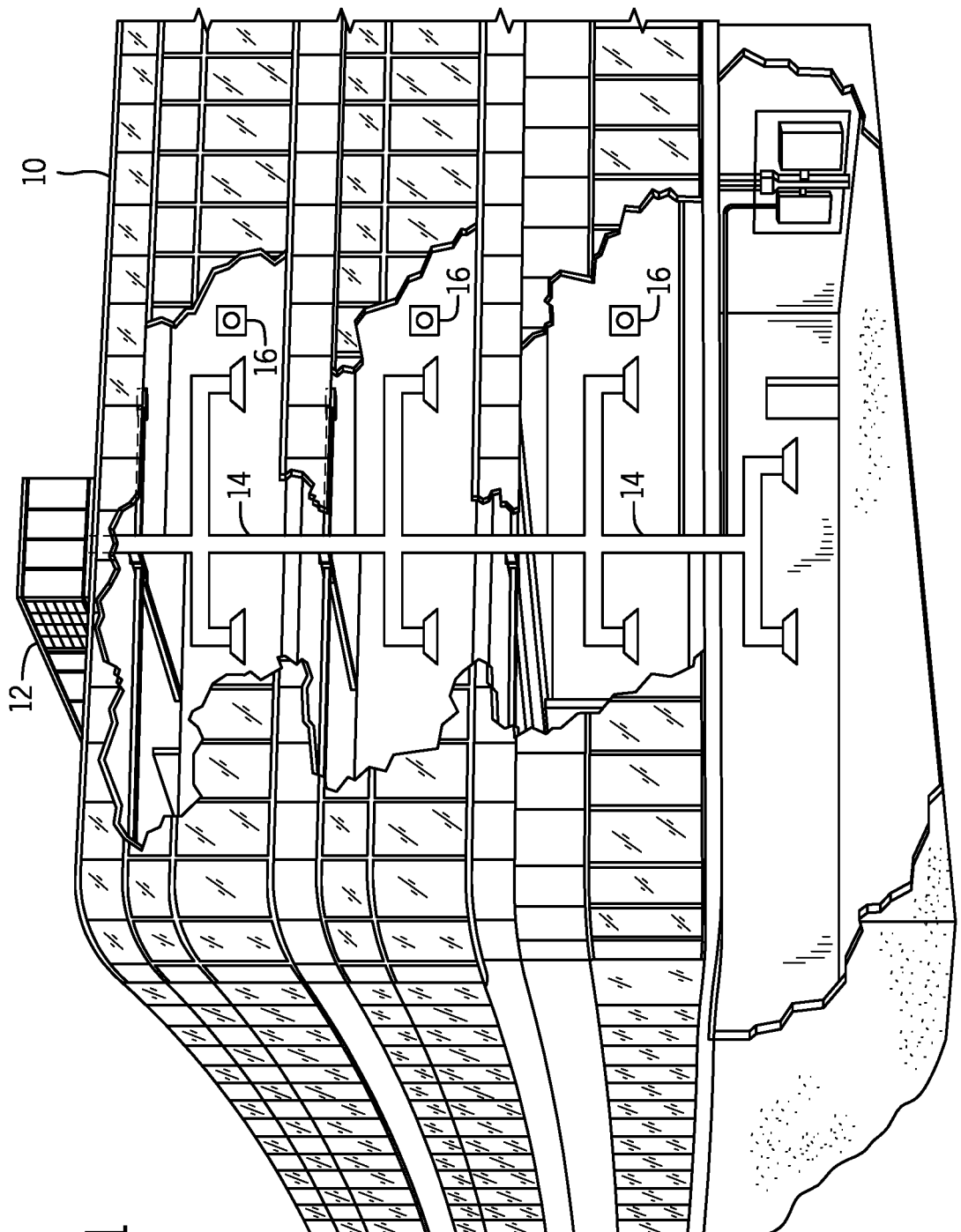
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A heating, ventilation, and/or air conditioning (HVAC) system may be used to thermally regulate a space within a building, home, or other suitable structure. For example, the HVAC system generally includes a vapor compression system that transfers thermal energy between a heat transfer fluid, such as a refrigerant, and a fluid to be conditioned, such as air. The vapor compression system includes a condenser and an evaporator that are fluidly coupled to one another via a conduit, such as a refrigerant circuit. A compressor is typically used to circulate the refrigerant through the conduit to transfer thermal energy between the condenser and the evaporator.

In many cases, the evaporator is used to condition an air flow entering a space within the building. For example, in cases when the HVAC system is operating in a cooling mode, suitable ductwork may direct an air flow across a heat exchange area of the evaporator, thereby enabling refrigerant within the evaporator to absorb thermal energy from the air flow. Accordingly, the evaporator may cool the air flow prior to discharging the air flow into the space. In some cases, the refrigerant within the evaporator absorbs sufficient thermal energy to boil, such that the refrigerant exits the evaporator in a hot, gaseous phase. The compressor circulates the gaseous refrigerant toward the condenser, which may be used to remove the absorbed thermal energy from the refrigerant. For example, ambient air from the atmosphere may be drawn across a heat exchange area of the condenser and enable the gaseous refrigerant to transfer thermal energy to the ambient air. In many cases, the condenser enables the refrigerant to change phase, or condense, from the gaseous phase to the liquid phase before the liquid refrigerant is redirected toward the evaporator for reuse.

As will be discussed in further detail below, certain HVAC systems may include zoned HVAC systems configured to concurrently regulate separate climate conditions within a plurality of separate spaces or rooms of a building or other structure. These previously designated spaces or rooms may form zones of the zoned HVAC system. Zoned HVAC systems often utilize a control system to control the operation of certain air conditioning devices and/or equipment that enable the independent adjustment of respective climate parameters or characteristics within each of the zones. For example, a zone controller of the HVAC system may be configured to adjust devices of the HVAC system to maintain a respective air temperature within each zone at a desired setting or within a desired range. Accordingly, the zone controller enables the individual management of climate parameters within the zones.

In many cases, a cooling demand or a cooling load of the zones varies throughout certain operational periods of the HVAC system. For example, a cooling demand of the zones is generally elevated during the daytime hours, during which an ambient temperature surrounding the building may be relatively high. Conversely, the cooling demand may decrease in response to a fall in ambient temperatures during the overnight hours. Relatively high ambient temperatures often reduce a heat transfer rate between heated refrigerant circulating through the condenser and the ambient air flowing thereacross. Accordingly, a temperature of the refrigerant returning to the evaporator may be elevated during such time periods, thereby reducing an ability of the refrigerant to absorb thermal energy and increasing a power consumption of the HVAC system during conditioning of the zones. Moreover, a cost of electrical energy often increases during portions of the day where the cooling demand is elevated, thus increasing an operating cost of the HVAC system. Throughout the following discussion, a designated time indicative of such inopportune operational periods of the HVAC system will be referred to as the "peak load hours." That is, the peak load hours correspond to a time period during which an operational efficiency of the HVAC system is reduced and/or during which electricity costs are relatively high. As a non-limiting example, the peak load hours may be between about 6 a.m. and about 8 p.m., between about 8 a.m. and about 4 p.m., or between about 10 a.m. and about 2 p.m. of a particular day. However, it should be noted that the peak load hours may occur during any other time range(s) throughout a day, depending on a location, such as geographic location, of the HVAC system and/or an operational mode of the HVAC system.

It is now recognized that an energy efficiency of the HVAC system may be improved by mitigating air conditioning operations of the HVAC system during the peak load hours, and instead, conducting air conditioning operations during designated time periods between the peak load hours, which are referred to herein as "off-peak hours." More specifically, it is recognized that an energy efficiency of the HVAC system may be improved by pre-running the HVAC system during the off-peak hours to condition air, storing this conditioned air within a zone of the building, and retrieving the conditioned air during the peak load hours to condition another zone or zones of the building.

With the forgoing in mind, embodiments of the present disclosure are directed to a zoning system configured to enable the storage and retrieval of conditioned air from one or more zones of the building. Specifically, the zoning system enables an HVAC system to condition air during the off-peak hours and store this conditioned air within a designated storage zone of the building. The zoning system thereby enables the HVAC system to store thermal energy within the storage zone in the form of heated air or cooled air. The zoning system enables retrieval of this stored, previously-conditioned air from the storage zone during the peak load hours and enables the transfer the previously-conditioned air to the zones calling for heating or cooling. Accordingly, the HVAC system may condition zones during the peak load hours using air that has been previously conditioned by the HVAC system during the off-peak hours. That is, the HVAC system may condition zones calling for heating or cooling during the peak load hours without involving activation of an evaporator or a furnace system to condition new, unconditioned air during the peak load hours. The zoning system thereby enhances an operational efficiency of the HVAC system by enabling the HVAC system to conduct air conditioning operations during opportune operational periods including, but not limited to, the off-peak hours, to store conditioned air for later retrieval during inopportune operational periods, such as during the peak load hours.

For example, the zoning system includes a plurality of ducts forming an air distribution system throughout the building. The ducts include return air ducts and supply air ducts that extend between and fluidly couple air conditioning components of the HVAC system and the zones of the building. In particular, each zone may be associated with a respective return air duct and a respective supply air duct that enables the HVAC system to receive air from and supply air to a particular zone. The return and supply air ducts respectively include return air dampers and supply air dampers, which enable the zoning system to regulate air circulation and flow rate throughout the individual zones of the building. The return air dampers and the supply air dampers also enable the zoning system to operate in a charging mode to accumulate conditioned air within the storage zone of the building. As described in greater detail herein, the term "charging mode" is indicative of an operating mode of the zoning system in which air within the storage zone is continuously recirculated across air conditioning components of the HVAC system, such as an evaporator or a furnace system. Accordingly, in the charging mode, the zoning system enables the HVAC system to thermally charge the storage zone with conditioned air having a temperature that is significantly greater than or less than a temperature of air within the remaining zones of the building. For clarity, as used herein, the term "thermally charge" is defined as the process of continuously conditioning air within the storage zone, particularly during the off-peak hours, until a predetermined temperature set point or other operating parameter of the zoning system is met.

Once the storage zone is thermally charged or, in other words, once a target temperature within the storage zone is met, the zoning system may suspend operation of the HVAC system and close the supply air damper(s) and the return air damper(s) associated with the storage zone. Accordingly, the zoning system may ensure that the conditioned air is substantially sealed or contained within the storage zone. As noted above, the storage zone may thus store thermal energy in the form of heated air or cooled air. To enable retrieval of the stored air during the peak load hours, the return air damper of the storage zone may transition to an open position, enabling a fan of the HVAC system to retrieve previously-conditioned air from the storage zone. The remaining dampers of the zoning system are positioned to direct this previously-conditioned air to the zone(s) calling for heating or cooling, and thus, enable the HVAC system to condition these zones. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
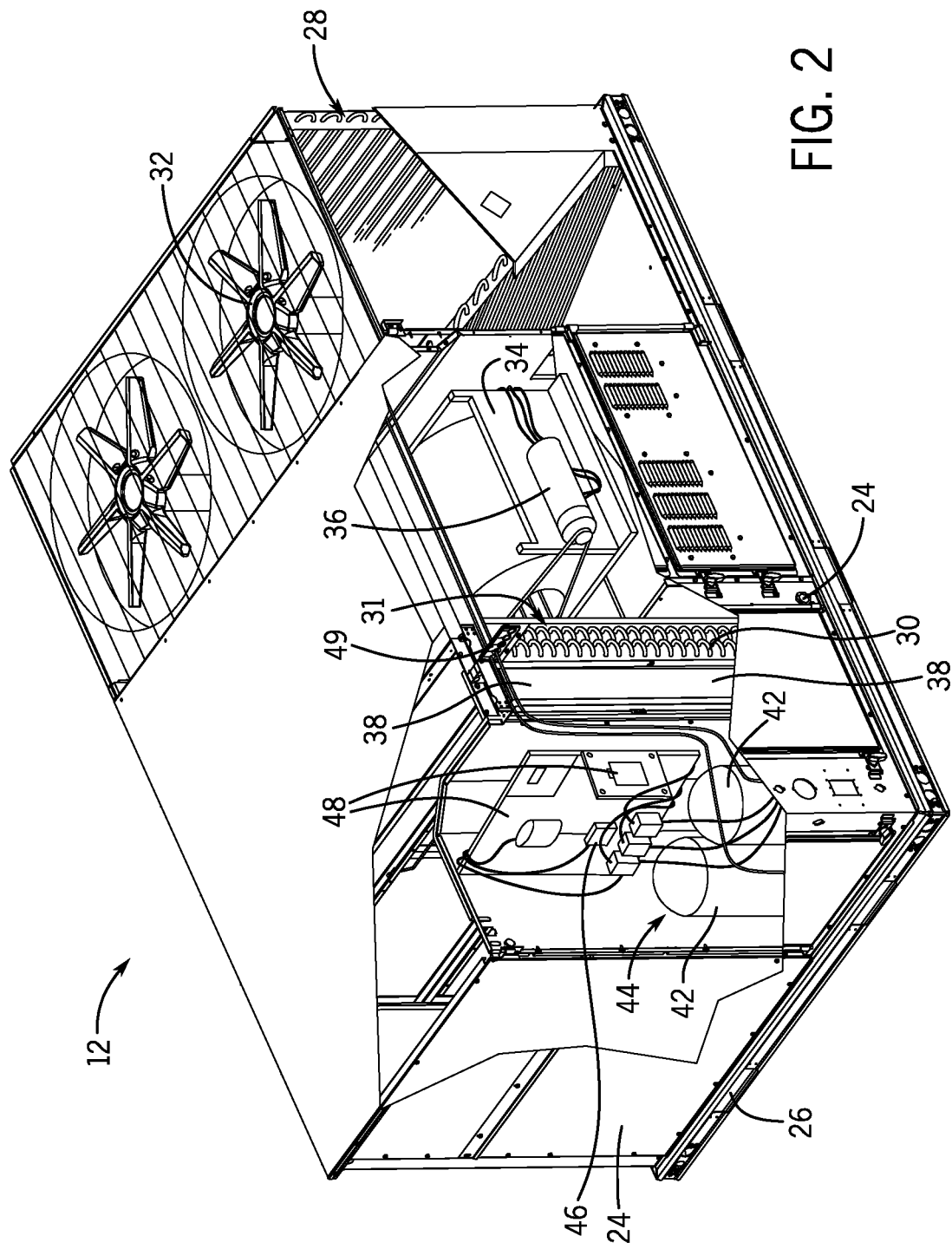
FIG. 2 is a perspective view of an embodiment of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
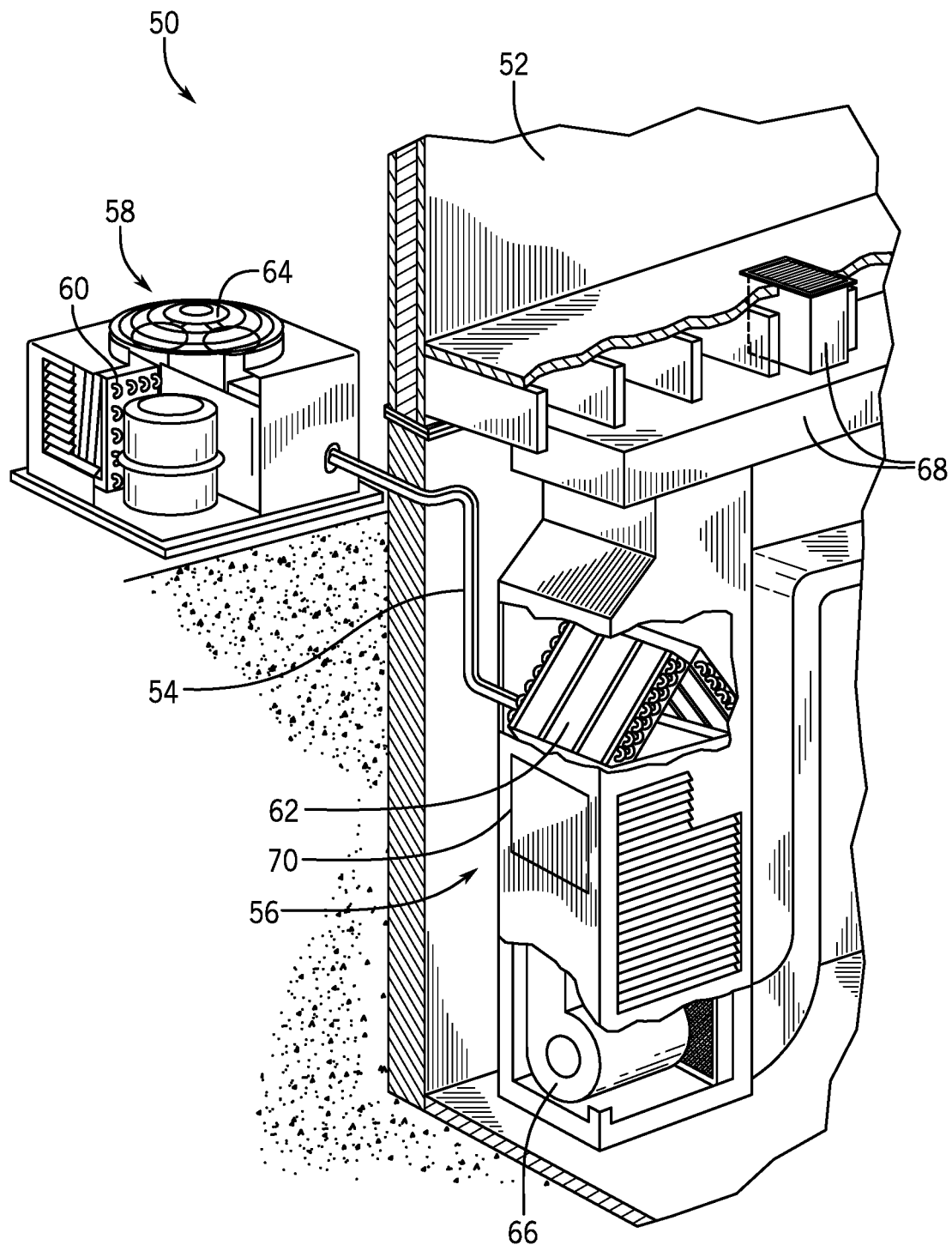
FIG. 3 is a perspective view of an embodiment of a residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
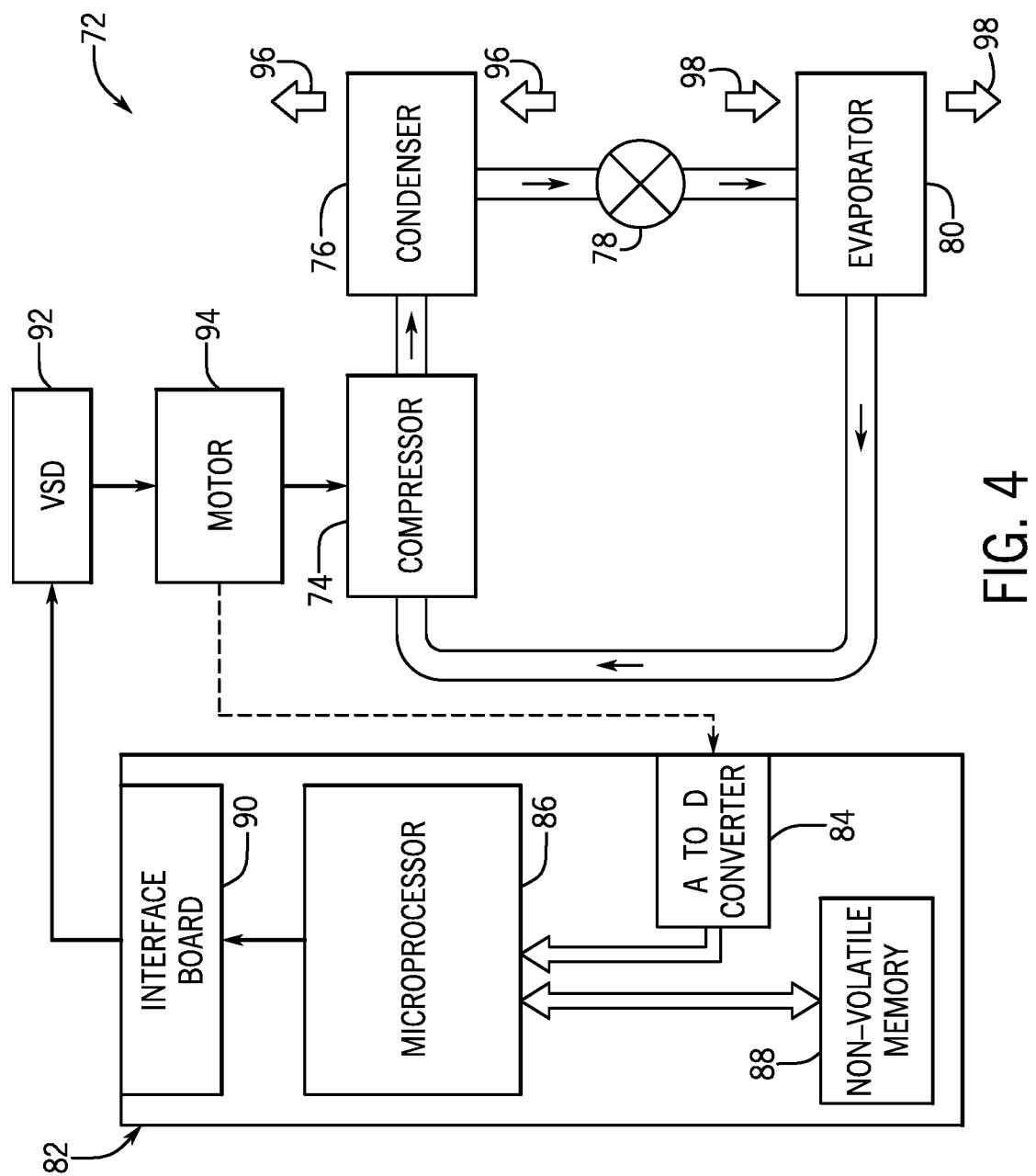
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As noted above, embodiments of the present disclosure are directed to a zoning system configured to enable the storage of thermal energy within one or more zones of the building 10 or other suitable structure. That is, the zoning system enables an HVAC system to thermally charge a designated storage zone during opportune operational periods, such as off-peak hours, of the HVAC system. As described in greater detail herein, a zone controller of the zoning system may determine suitable off-peak hours, or a first designated time, during which the HVAC system may thermally charge the storage zone based on certain operational parameters of the zoning system and/or the HVAC system, such as an ambient temperature external the building 10, a temperature within the building 10, current or historic weather data, current or historic cost of electrical energy, occupancy data within the building 10, previously stored operational data of the HVAC system, and/or any other suitable parameter or combination of parameters. In addition, the zone controller may use one or more of the aforementioned parameters to determine suitable peak load hours, or a second designated time, during which the HVAC system may retrieve the previously-conditioned air from the storage zone and transfer this conditioned air to other zones of the building calling for heating or cooling. Accordingly, the zone controller may mitigate or reduce air conditioning operations of the HVAC system during inopportune operational periods where an efficiency of the HVAC system is decreased and/or a cost of operating the HVAC system is elevated.

Figure 5:
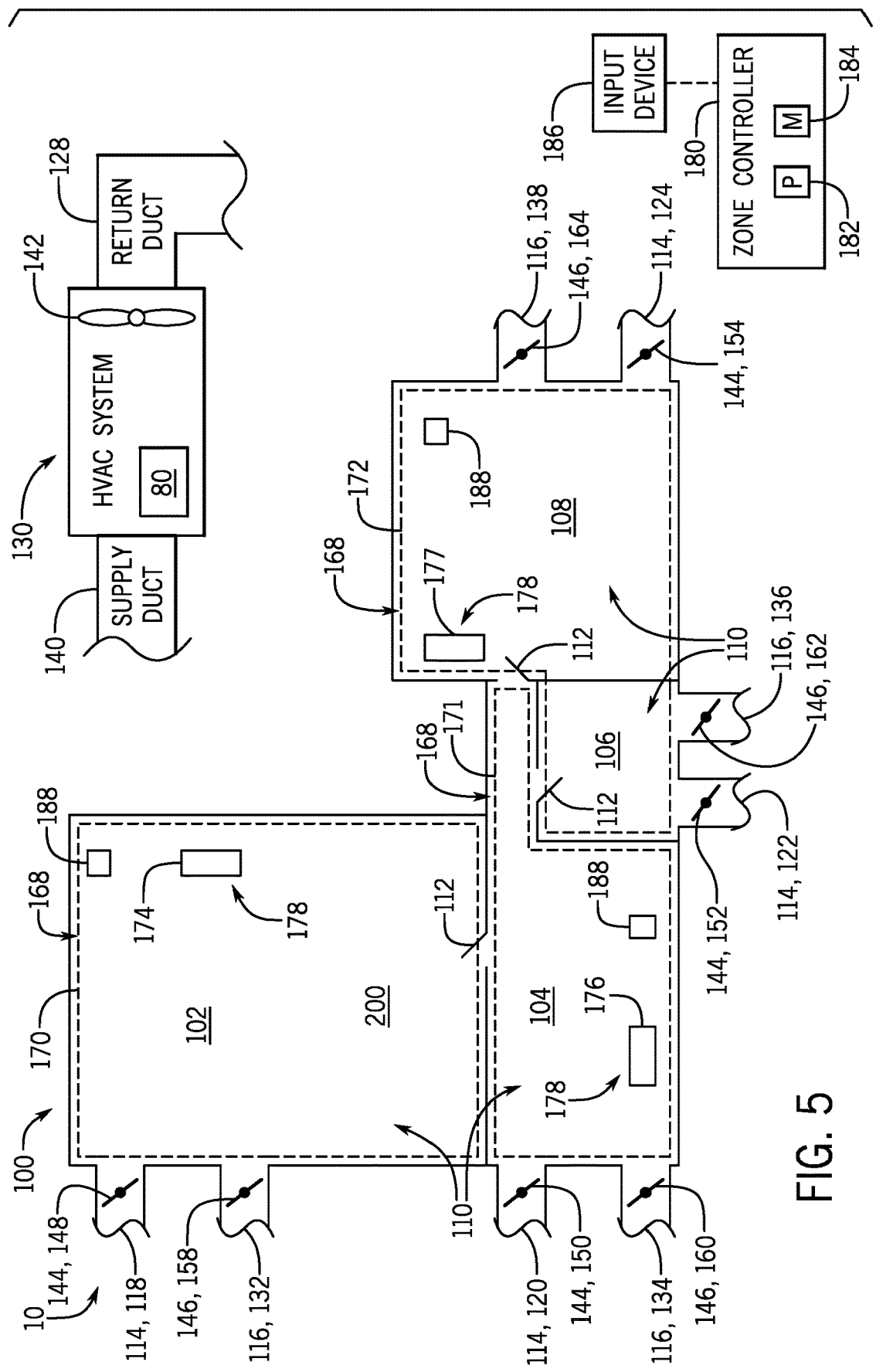
FIG. 5 is a schematic diagram of an embodiment of a zoning system that may be used with the HVAC system of FIGS. 1-4, in accordance with an aspect of the present disclosure.

With the foregoing in mind, FIG. 5 illustrates schematic view of an embodiment a zoning system 100 configured to enable the storage of thermal energy within the building 10. As shown in the illustrated embodiment, the building 10 includes a first room 102, a second room 104, a third room 106, and a fourth room 108, which are collectively referred to herein as rooms 110. It should be noted that the term "room" is defined as conventionally understood and as further described herein. For example, a room is defined as any suitable space or territory of the building 10 including a garage that is attached or detached from the building 10, a basement or attic of the building 10, a storage area of the building 10, or any other suitable structure associated with the building 10. As shown in the illustrated embodiment, access between each of the rooms 110 is provided via a plurality of doors 112, which enable an occupant to traverse the building 10 and each of the rooms 110. Although a single floor or level of the building 10 is shown in the illustrated embodiment, it should be noted that the building 10 may include 1, 2, 3, 4, 5, 6, or more floors, each having respective rooms, such as the rooms 110.

In the illustrated embodiment, each of the rooms 110 is associated with a respective one of a plurality of return air ducts 114 and a respective one of a plurality of supply air ducts 116 included in the zoning system 100. The return air ducts 114 and the supply air ducts 116 collectively form an air distribution system of the building 10. For example, the return air ducts 114 include a first return air duct 118, a second return air duct 120, a third return air duct 122, and a fourth return air duct 124 that are associated with the first room 102, the second room 104, the third room 106, and the fourth room 108, respectively. The return air ducts 114 are in fluid communication with a central return duct 128 of an HVAC system 130 associated with the building 10. The HVAC system 130 may include the HVAC unit 12 shown in FIG. 2, the residential heating and cooling system 50 show in FIG. 3, a rooftop unit, or any other suitable HVAC system. Accordingly, the HVAC system 130 forms a portion of the zoning system 100.

Similar to the return air ducts 114 discussed above, the supply air ducts 116 include a first supply air duct 132, a second supply air duct 134, a third supply air duct 136, and a fourth supply air duct 138 that are respectively associated with the first room 102, the second room 104, the third room 106, and the fourth room 108. The supply air ducts 116 are fluidly coupled to a central supply duct 140 of the HVAC system 130. Accordingly, the return air ducts 114 and the supply air ducts 116 define independent air flow paths between the HVAC system 130 and each of the rooms 110. The HVAC system 130 includes one or more fans or blowers 142, such as the blower assembly 34, which enable the HVAC system 130 to retrieve air from each of the rooms 110 via the return air ducts 114. If the HVAC system 130 is operating in a cooling mode, refrigerant circulating through an evaporator of the HVAC system 130, such as the evaporator 80, may absorb thermal energy from the air traversing the HVAC system 130. Accordingly, the HVAC system 130 may discharge cooled air to the rooms 110 via the supply air ducts 116 and thereby maintain a desired air temperature within the rooms 110. It should be noted that, although each of the rooms 110 includes a dedicated return air duct and a dedicated supply air duct in the in illustrated embodiment of FIG. 5, in other embodiments, certain of the rooms 110 may not include a dedicated return air duct, a dedicated supply air duct, or both.

As shown in the illustrated embodiment, the return air ducts 114 include respective return air dampers 144, and the supply air ducts 116 include respective supply air dampers 146. That is, the first, the second, the third, and the fourth return air ducts 118, 120, 122, and 124 are respectively equipped with a first return air damper 148, second return air damper 150, third return air damper 152, and a fourth return air damper 154, which are collectively referred to herein as the return air dampers 144. Similarly, the supply air dampers 146 include a first supply air damper 158, a second supply air damper 160, a third supply air damper 162, and a fourth supply air damper 164 disposed within the first, the second, the third, and the fourth supply air ducts 132, 134, 136, 138, respectively. As described in greater detail herein, the return air dampers 144 and the supply air dampers 146 may transition between respective open and closed positions to regulate a flow rate of air to and from each of the rooms 110. Accordingly, the return air dampers 144 and the supply air dampers 146 form a portion of the air distribution system of the building 10.

The zoning system 100 includes a plurality of zones 168, each zone 168 associated within one or more of the rooms 110. For example, a first zone 170 of the building 10 is associated with the first room 102, a second zone 171 of the building 10 is associated with the second room 104, and a third zone 172 of the building 10 is associated with the third and fourth rooms 106 and 108. In some embodiments, each of the zones 168 includes a designated thermostat or control device, which is configured to monitor climate parameters within that particular zone. For example, the first zone 170, the second zone 171, and the third zone 172 respectively include a first control device 174, a second control device 176, and a third control device 177, which are collectively referred to herein as control devices 178. The control devices 178 may include thermostats, a zone controller, or other control device, which may be configured to measure an air temperature within the zones 168. In certain embodiments, the control devices 178 include additional sensors configured to measure other climate parameters within the zones 168. As a non-limiting example, the sensors may include air quality sensors, humidity sensors, carbon dioxide sensors, or any other suitable sensors configured to measure climate parameters within the zones 168. The sensors may be integrated with the control devices 178 or include separate sensors that are disposed independently of the control devices 178 throughout the zones 168. In embodiments where the control devices 178 include external sensors, these sensors may be communicatively coupled to the control devices 178 via wired or wireless communications devices, including any of the communication devices discussed in detail below. Although the zones 168 are shown as including either a single room 110 or a pair of rooms 110 in the illustrated embodiment of FIG. 5, it should be noted that each of the zones 168 may include any suitable quantity of rooms 110. For example, the zones 168 may each include may include 1, 2, 3, 4, 5, 6, or more than 6 rooms 110 of the building 10.

The zoning system 100 includes a zone controller 180, or a control system, which may be used to control certain components of the zoning system 100 and/or the HVAC system 130. The zone controller 180 may be disposed within one of the zones 168, in one of the rooms 110, or in another suitable location. One or more control transfer devices, such as wires, cables, wireless communication devices, and the like, may communicatively couple the fans 142, the return air dampers 144, the supply air dampers 146, the control devices 178, or any other suitable components of the zoning system 100 and/or the HVAC system 130 to the zone controller 180. That is, the fans 142, the return air dampers 144, the supply air dampers 146, and the control devices 178 may each have a communication component that facilitates wired or wireless communication between the zone controller 180, the fans 142, the return air dampers 144, the supply air damper 146, and the control devices 178 via a network. In some embodiments, the communication component may include a network interface that enables the components within the zoning system 100 and/or the components of the HVAC system 130 to communicate via various protocols such as EtherNet/IP, ControlNet, DeviceNet, or any other communication network protocol. Alternatively, the communication component may enable the components of the zoning system 100 and/or the components of the HVAC system 130 to communicate via mobile telecommunications technology, Bluetooth®, near-field communications technology, and the like. As such, the zone controller 180, the fans 142, the return air dampers 144, the supply air dampers 146, and the control devices 178 may wirelessly communicate data between each other.

The zoning controller 180 includes a processor 182, such as a microprocessor, which may execute software for controlling the components of the zoning system 100 and/or components of the HVAC system 130. The processor 182 may include multiple microprocessors, one or more "general-purpose" microprocessors, one or more special-purpose microprocessors, and/or one or more application specific integrated circuits (ASICS), or some combination thereof. For example, the processor 182 may include one or more reduced instruction set (RISC) processors. The zone controller 180 may also include a memory device 184 that may store information such as control software, look up tables, configuration data, etc. The memory device 184 may include a volatile memory, such as random access memory (RAM), and/or a nonvolatile memory, such as read-only memory (ROM). The memory device 184 may store a variety of information and may be used for various purposes. For example, the memory device 184 may store processor-executable instructions including firmware or software for the processor 182 execute, such as instructions for controlling the components zoning system 100 and/or the HVAC system 130. In some embodiments, the memory device 184 is a tangible, non-transitory, machine-readable-medium that may store machine-readable instructions for the processor 182 to execute. The memory device 184 may include ROM, flash memory, a hard drive, or any other suitable optical, magnetic, or solid-state storage medium, or a combination thereof. The memory device 184 may store data, instructions, and any other suitable data.

In some embodiments, an occupant of the building 10 may input a desired target temperature for certain of the zones 168 using the control devices 178 and/or the zone controller 180. For example, the control devices 178 and/or the zone controller 180 may include a suitable input device 186, such as a graphical user interface (GUI), which enables the occupant to provide operational commands and input data into the zoning system 100 and/or the HVAC system 130. The target temperature may be the same of different for each of the zones 168 and may be stored in, for example, the memory device 184 of the zone controller 180. The zone controller 180 is configured to control operation of the zoning system 100 and/or the HVAC system 130 to maintain the target temperature within each of the zones 168.

For example, the zone controller 180 may monitor an actual air temperature within the first zone 170 via the first control device 174. If the actual air temperature within the first zone 170 deviates from the previously-determined target temperature by a threshold amount, the zone controller 180 may instruct the first return air damper 148 and the first supply air damper 158 to transition toward a respective open or closed position. Accordingly, the zone controller 180 may increase or decrease, respectively, a flow rate of conditioned air supplied to the first zone 170 via the HVAC system 130. The zoning system 100 thereby enables the HVAC system 130 to maintain an actual temperature within the first zone 170 at a value substantially similar to the target temperature. The zone controller 180 may operate the second, the third, and the fourth return air dampers 150, 152, and 154 and the second, the third, and the fourth supply air dampers 160, 162, and 164, in accordance with the techniques discussed above to substantially maintain a desired target temperature value within the second and third zones 171 and 172. Throughout the following discussion, it should be noted that the return air dampers 144 and the supply air dampers 146 may each operate to regulate the extraction of air from, or the supply of air to a particular zone of the building 10. That is, the return air dampers 144 are not limited to regulating air extraction from a particular zone, while the supply air dampers 146 are not limited to regulating air supply to a particular zone. As a non-limiting example, in some embodiments, the fans 142 of the HVAC system 130 may draw a flow of air through the first return air damper 148, the first return air duct 118, and into the central return air duct 128 of the HVAC system 130. As such, the first supply air damper 148 may be used to regulate a flow rate of air extracted from the first zone 170. However, in other embodiments, the fans 142 may operate to direct an air flow through the central return air duct 128, the first return air duct 118, the first return air damper 148, and into the first zone 170. In such embodiments, the first return air damper 148 may be used to regulate a flow rate of air that is supplied to, rather than extracted from, the first zone 170. Accordingly, the return air dampers 144 and the supply air dampers 146 may each be used to facilitate the extraction of air from, or the supply of air to a particular one of the zones 168.

As noted above, the zoning system 100 is configured to thermally charge a designated thermal storage zone of the building 10. In some embodiments, the thermal storage zone is previously determined and may be identified in the memory device 184 of the zone controller 180. That is, an occupant or resident of the building 10 may utilize the input device 186 designate a particular one of the zones 168 as the thermal storage zone. In such embodiments, the zone designated as the thermal storage zone may be invariant throughout operation of the zoning system 100. In other embodiments, the thermal storage zone may be selected and/or updated by the zone controller 180 based certain operational parameters of the zoning system 100, the HVAC system 130, and/or the building 10.

For example, in some embodiments, the zone controller 180 may be communicatively coupled to occupancy sensors 188 disposed within one or more of the zones 168 or rooms 110. The occupancy sensors 188 provide the zone controller 180 with feedback indicative of an occupancy within each of the zones 168. The occupancy sensors 188 may include, but are not limited to, passive infrared sensors, ultrasonic sensors, audio sensors, or the like. The zone controller 180 may evaluate occupancy data provided by the occupancy sensors 188 to determine and select an unoccupied one of the zones 168 as the thermal storage zone. Accordingly, the zone controller 180 may ensure an occupied zone is not selected as the thermal storage zone.

In some embodiments, each of the zones 168 may be associated with a predetermined priority value that is selected by the occupant or the zone controller 180. That is, zones favorable for thermal storage may include a relatively high priority value, while a priority value associated with zones unfavorable for thermal storage is relatively low. For example, zones associated with a relatively large interior volume of the building 10 may be more favorable to thermal storage than zones associated with a relatively small interior volume of the building 10. Accordingly, a priority value of larger zones may be greater than a priority value of smaller zones. As such, a priority value of each of the zones 168 may be based on physical parameters of the respective zones 168. In some embodiments, the zone controller 180 may be configured to select an unoccupied one of the zones 168 having the highest priority value as the storage zone.

In certain embodiments, the thermal storage zone may be determined and selected based on historical occupancy data of each of the zones 168, rather than current occupancy data. For example, the zone controller 180 may monitor an occupancy within each of the zones 168 throughout operation of the zoning system 100. The zone controller 180 may store such occupancy data within the memory device 184 and determine time periods during which certain of the zones 168 are generally or typically unoccupied. As a non-limiting example, the zone controller 180 may determine that the first zone 170 is generally unoccupied between 8 a.m. and 12 a.m., while the second zone 171 is generally unoccupied between 12 a.m. and 6 p.m. In such an example, if thermal charging of a zone is desired between 8 a.m. and 12 a.m., the zone controller 180 may select the first zone as the designated thermal storage zone. Conversely, if the zone controller 180 determines that thermal charging of a zone is desired between 12 a.m. and 6 p.m., the zone controller 180 may select the second zone 171 as the thermal storage zone. Additionally or alternatively, the thermal storage zone may be selected based on any other operational parameters or operational constraints of the zoning system 100, the HVAC system 130, and/or the building 10. Moreover, it should be noted that the thermal storage zone may indeed be occupied in certain embodiments of the zoning system 100. That is, the zone controller 180 may select an occupied or unoccupied zone as the thermal storage zone.

For clarity, the first zone 170 is designated as the thermal storage zone in the exemplary embodiments discussed herein. Accordingly, the first zone 170 is also referred to as a thermal storage zone 200 throughout the following discussion. However, as noted above, the thermal storage zone 200 may include any other zone or combination of zones of the building 10. Specifically, the thermal storage zone 200 may include the first zone 170, the second zone 171, the third zone 172, or any combination thereof.

Figure 6:
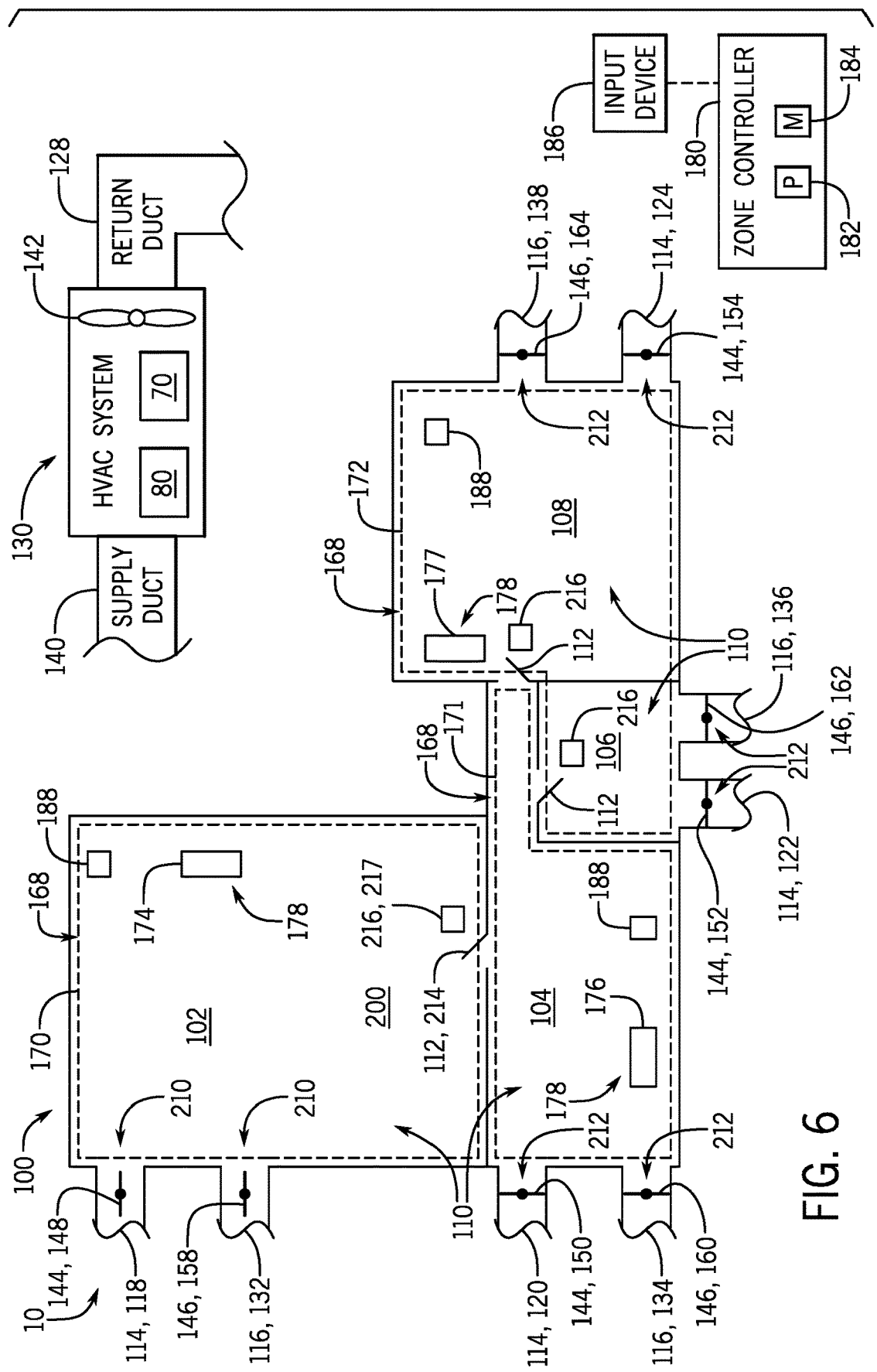
FIG. 6 is a schematic diagram of an embodiment of the zoning system operating in a charging mode, in accordance with an aspect of the present disclosure.

With the foregoing in mind, FIG. 6 is a schematic of an embodiment of the zoning system 100 operating in a charging mode to thermally charge the thermal storage zone 200. As noted above, in the charging mode, the zoning system 100 enables the HVAC system 130 to continuously condition air within the thermal storage zone 200 to store conditioned air within the thermal storage zone 200 for later use in conditioning spaces within the building 10. In particular, during the charging mode, the HVAC system 130 operates to condition air within the thermal storage 200 to be at a temperature that may be significantly above or below a temperature of air within remaining zones 168 of the building 10. It should be noted that the HVAC system 130 is operating in a cooling mode throughout the following discussion, and is therefore configured to thermally charge the thermal storage zone 200 with cool air that is conditioned by the evaporator 80. However, in embodiments where the HVAC system 130 is operating in a heating mode, the zoning system 100 thermally charges the thermal storage zone 200 with heated air, rather than cooled air. For example, the HVAC system 130 may thermally charge the thermal storage zone 200 with air heated by a heating coil or a furnace system, such as the furnace system 70.

Regardless, to operate the zoning system 100 in the charging mode, the zone controller 180 instructs the first return air damper 148 and the first supply air damper 158 to transition to respective fully open positions 210. Conversely, the zone controller 180 may instruct the second, the third, and the fourth return air dampers 150, 152, and 154 and the second, the third, and the fourth supply air dampers 160, 162, and 164 to transition to respective fully closed positions 212. Accordingly, the HVAC system 130 may circulate air between the air conditioning components of the HVAC system 130 and the thermal storage zone 200. That is, the HVAC system 130 may intake air from the thermal storage zone 200, condition the air via the evaporator 80, and discharge the air into the thermal storage zone 200 as conditioned, cooled air. The HVAC system 130 continues to condition the air within the thermal storage zone 200 to thermally charge the storage zone 200.

As shown in the illustrated embodiment of FIG. 6, a first door 214 is associated with the thermal storage zone 200 and enables an occupant to enter or leave the thermal storage zone 200. That is, the first door 214 corresponds to the first room 102 of the building 10. In certain embodiments, the zoning system 100 includes a plurality of position sensors 216 that are respectively associated with the doors 112 and are configured to provide the zone controller 180 with feedback indicative of a respective position of the doors 112. In some embodiments, the zone controller 180 does not thermally charge a particular zone 168 unless each door 214 associated with that zone 168 is disposed in a closed position. For example, a first position sensor 217 may provide the zone controller 180 with feedback indicative of a position of the first door 214, thereby enabling the zone controller 180 to determine whether the first door 214 is disposed in an open or partially open position or in a closed position. In certain embodiments, the zone controller 180 does not enable thermal charging of the thermal storage zone 200 unless the first position sensor 217 indicates that the first door 214 is disposed in the closed position. Accordingly, the HVAC system 130 may not attempt to thermally charge the thermal storage zone 200 when conditioned air may leak from the thermal storage zone 200 into the second zone 171 via the open first door 214. In some embodiments, the zoning system 100 may also include position sensors configured to provide feedback indicative of respective positions of windows within each of the zones 168. Similar to the discussion above, the zone controller 180 may block or prevent operation of the zoning system 100 in the charging mode if the position sensors 216 indicate that a window within the thermal storage zone 200 is disposed in an open or partially open position.

In some embodiments, the zoning system 100 includes auxiliary fans disposed within one or more of the return air ducts 114 and/or one or more of the supply air ducts 116. The auxiliary fans are configured to assist the fans 142 in circulating air between the HVAC system 130 and the zones 168. The auxiliary fans may be communicatively coupled to the zone controller 180, thereby enabling the zone controller 180 to activate or deactivate the auxiliary fans, or adjust an operational speed of the auxiliary fans, based on an operating mode of the zoning system 100 and/or the HVAC system 130. For example, when operating the zoning system 100 in the charging mode in the illustrated embodiment, the zone controller 180 may activate a set of auxiliary fans respectively disposed within the first return air duct 118 and the first supply air duct 132. Accordingly, the first set of auxiliary fans may facilitate the ingress and egress of air through the first return air duct 118 and the first supply air duct 132, respectively. Conversely, the zone controller 180 may deactivate any remaining auxiliary fans of the zoning system 100 that are associated with the second and the third zones 171 and 172.

In some embodiments, the zone controller 180 may adjust a speed of the auxiliary fans based on a position of the return air dampers 144 and/or a position of the supply air dampers 146. As a non-limiting example, if the first return air damper 148 transitions from a fully closed position toward the respective fully open position 210, the zone controller 180 that may activate an auxiliary fan disposed within the first return air duct 118 and subsequently increase an operational speed of this auxiliary fan proportionally to a position of the first return air damper 148. The zone controller 180 may operate any of the auxiliary fans disposed within the return air ducts 114 and/or the supply air ducts 116 in accordance with this technique.

Figure 7:
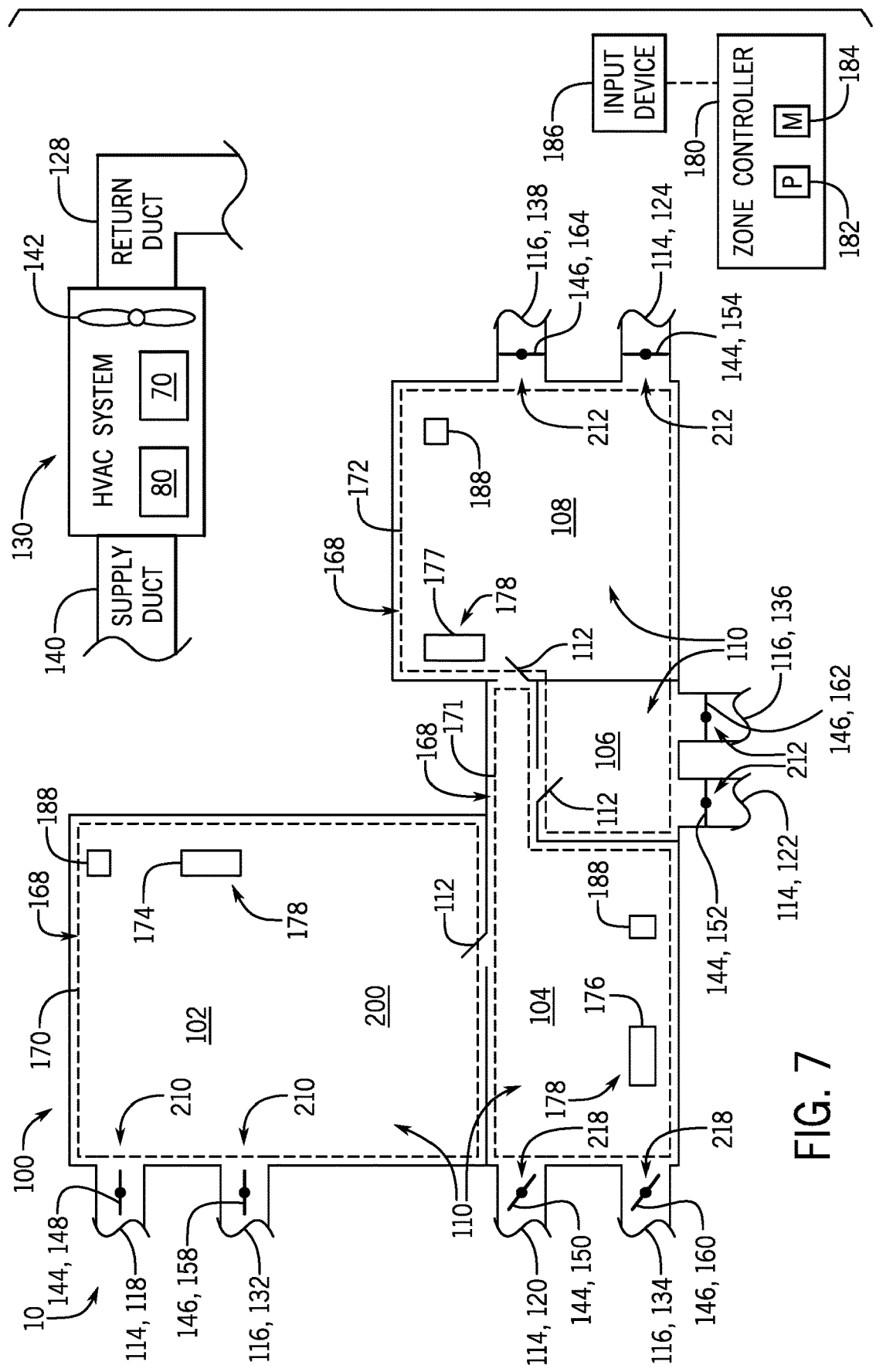
FIG. 7 is a schematic diagram of an embodiment of the zoning system operating in a charging mode, in accordance with an aspect of the present disclosure.

Although the second, the third, and the fourth return air dampers 150, 152, and 154 and the second, the third, and the fourth supply air dampers 160, 162, and 164 are closed in the illustrated embodiment of FIG. 6, it should be noted that in other embodiments, one or more supply dampers 146 and/or return dampers 144 of the second and the third zones 171 and 172 may be disposed in an open or partially open position during the charging mode of the zoning system 100. For example, in some embodiments, the second zone 171 may be calling for cooling while the zoning system 100 is thermally charging the first zone 170 or the thermal storage zone 200. As shown in the illustrated embodiment of FIG. 7, in such an example, the second return air damper 150 and the second supply air damper 160 may be disposed in respective partially open positions 218, or in respective fully open positions, thereby enabling the HVAC system 130 to supply conditioned air to the second zone 171 while simultaneously thermally charging the storage thermal zone 200. As such, the HVAC system 130 may ensure that a previously determined temperature set point of each of the zones 168 is maintained even while thermally charging the thermal storage zone 200.

In some embodiments, the zone controller 180 determines a first designated time period to thermally charge the thermal storage zone 200 based on various factors, such as weather forecast data, historical weather data, a time of day, current or historic electricity costs, occupancy data or data associated with the building 10, or any other suitable parameters. That is, the zone controller 180 may determine opportune operational periods or off-peak hours during which to thermally charge the thermal storage zone 200 based on one or more of the aforementioned parameters.

For example, in some embodiments, the zone controller 180 may be communicatively coupled to a weather station or service providing the zone controller 180 with feedback indicative of local weather forecast data near the building 10. If the weather forecast data indicates an expected occurrence of relatively high ambient air temperatures throughout particular time periods of a day, the zone controller 180 may pre-run the HVAC system 130 prior to these identified time periods to store conditioned air within the thermal storage zone 200. As a non-limiting example, the zone controller 180 may receive feedback from the weather station or service indicating a weather forecast for the subsequent day. In such an example, the provided weather forecast data may indicate that an ambient air temperature from 4 a.m. to 8 a.m. is expected to be relatively low, while the ambient temperature from 8 a.m. to 12 a.m. is expected to be relatively high. Accordingly, the zone controller 180 may determine that the off-peak operational hours of the HVAC system 130 for this particular day are between 4 a.m. and 8 a.m., during which cooler ambient temperatures may enhance an operational efficiency of the HVAC system 130. The zone controller 180 may thus instruct the HVAC system 130 to pre-run between the hours of 4 a.m. to 8 a.m. to thermally charge the thermal storage zone 200 with conditioned air. As described in greater detail below, after the off-peak hours have elapsed, such as when the local time surpasses 8 a.m. in the aforementioned example, the zone controller 180 may instruct the HVAC system 130 to cease thermally charging the thermal storage zone 200.

In some embodiments, the zone controller 180 may determine suitable off-peak hours to thermally change the thermal storage zone 200 based on real-time weather data acquired by climate measuring instruments of the zoning system 100 and/or the HVAC system 130. For example, zone controller 180 may be communicatively coupled to and configured to receive feedback from a thermometer, a barometer, a hygrometer, an anemometer, a pyrometer, or any other instrument configured to measure climate parameters external to the building 10. The zone controller 180 may be configured to thermally charge the thermal storage zone 200 when one or more of the measured climate parameters is within a threshold range corresponding to an enhanced operational efficiency of the HVAC system 130. For example, the zone controller 180 may be configured to operate the zoning system 100 in the charging mode to store cooled air within the thermal storage zone 200 when an actual ambient temperature external to the building 10 is below a target value by 0.5 degrees Celsius, 2 degrees Celsius, 4 degrees Celsius, 6 degrees Celsius, or more than 6 degrees.

In some embodiments, the zone controller 180 may determine a time range indicative of the off-peak hours based on historic weather data, rather than weather forecast data or real-time weather data. For example, the zone controller 180 may estimate expected ambient temperatures for a particular day based on average ambient temperatures recorded on that same calendar day throughout previous years. These previously recorded historic temperature values may be provided via the weather station or service or via an external database communicatively coupled to the zone controller 180, or the like. Additionally or alternatively, the zone controller 180 may predict ambient temperatures for a particular day based on temperature values measured by climate measuring instruments of the zoning system 100 in previous years, which may be stored in the memory device 184 of the zone controller 180 or another suitable memory device of the zoning system 100. In any case, the zone controller 180 may evaluate the historic weather data to predict ambient temperature fluctuations throughout certain hours of the day. Accordingly, the zone controller 180 may determine suitable off-peak operational hours to pre-run the HVAC system 130 and thermally charge the thermal storage zone 200.

In certain embodiments, the zone controller 180 may thermally charge the thermal storage zone 200 during a previously-determined time range of each day. For example, the zone controller 180 may be configured to thermally charge the thermal storage zone 200 between the hours of 7 a.m. and 10 a.m. of each day, or during any other suitable time range(s) of the day. In some embodiments, the predetermined time ranges may vary based on the month or season during which the zoning system 100 is operating.

In further embodiments, the zone controller 180 may determine off-peak hours to thermally charge the thermal storage zone 200 based on historic electricity costs, an actual electricity cost, and/or a predicted electricity cost. For example, the zone controller 180 may analyze historic electricity cost data to determine a predetermined time range in a particular day during which electricity costs have been relatively low in previous years and may store this time range as the off-peak hours for that particular calendar day. Additionally or alternatively, the zone controller 180 may determine the off-peak hours for a particular day in a current year based on feedback indicative of current electricity costs or predicted electricity costs. The zone controller 180 may receive this feedback from communication devices of a power grid or a power supply, or any other suitable data base communicatively coupled to the zone controller 180.

It should be noted that the aforementioned techniques for determining suitable off-peak hours of a day are by way of example, and the zone controller 180 may utilize any other suitable method or technique to determine which portion(s) of a day are associated with the off-peak hours. Further, it should be noted that the zone controller 180 may use a combination of one or more of the aforementioned techniques to determine the off-peak and the peak load hours of a day. In any case, the zone controller 180 operates the HVAC system 130 while within the off-peak hours until the off-peak hours have lapsed, or until the thermal storage zone 200 is thermally charged. That is, the zone controller 180 may operate the HVAC system 130 while within the off-peak hours until the thermal storage zone 200 acquires a full thermal charge or, as described in detail below, until the thermal storage zone 200 acquires a designated thermal charge that may be less than the full thermal charge.

The zone controller 180 may determine when the thermal storage zone 200 is fully thermally charged, or acquires a designated thermal charge, based on feedback from the first control device 174 indicative of the air temperature within the thermal storage zone 200. In embodiments where the HVAC system 130 is operating in the cooling mode, the thermal storage zone 200 acquires a full thermal charge when an air temperature within the thermal storage zone 200 falls below a target temperate by a threshold amount. In some embodiments, the target temperature may be between about 20 degrees Celsius and about 15 degrees Celsius, between about 15 degrees Celsius and about 10 degrees Celsius, or less than 10 degrees Celsius. The threshold amount may be between about 0.05 degrees Celsius and about 2 degrees Celsius, or greater than 2 degrees Celsius. A magnitude of the target temperature may be previously determined and stored within, for example, the memory device 184 of the zone controller 180. For example, in certain embodiments, an occupant of the building 10 may indicate the magnitude of the target temperature using the input device 186 associated with the control devices 178 and/or the zone controller 180.

It is important to note that the zoning system 100 also enables the storage of heated air, rather than cooled air. For example, in embodiments where the HVAC system 130 is operating in a heating mode, the zoning system 100 enables the HVAC system 130 to thermally charge the thermal storage zone 200 with heated air. In such embodiments, the thermal storage zone 200 may acquire a full thermal charge, or a designated thermal charge, when a temperature within the thermal storage zone 200 exceeds a target temperature by a threshold amount. For example, the target temperature may be between about 20 degrees Celsius and about 25 degrees Celsius, between about 25 degrees Celsius and about 30 degrees Celsius, or greater than 30 degrees Celsius. In any case, the thermal storage zone 200 acquires a full thermal charge when an air temperature within the thermal storage zone 200 is within a predetermined target temperature value by a threshold range.

In some embodiments, the thermal storage zone 200 may be selected based on the operating mode of the HVAC system 130. For example, if the HVAC system 130 is operating in the cooling mode, the zone controller 180 may select a zone located within a lower level or a lower story of the building 10 as the thermal storage zone 200. That is, the zone controller 180 may select the thermal storage zone 200 as a zone within a basement level or a ground level of the building 10. Conversely, if the HVAC system 130 is operating in the heating mode, the zone controller 180 may select the thermal storage zone 200 as a suitable zone located within an upper level or an upper story of the building 10. For example, the zone controller 180 may select a zone within the top floor of the building 10 or within an attic of the building 10 as the thermal storage zone 200. Accordingly, the zone controller 180 may facilitate cooling or heating air within the thermal storage zone 200 by locating the storage zone 200 within a portion of the building 10 having generally reduced or elevated ambient temperatures, depending on the operating mode of the HVAC system 130.

Figure 8:
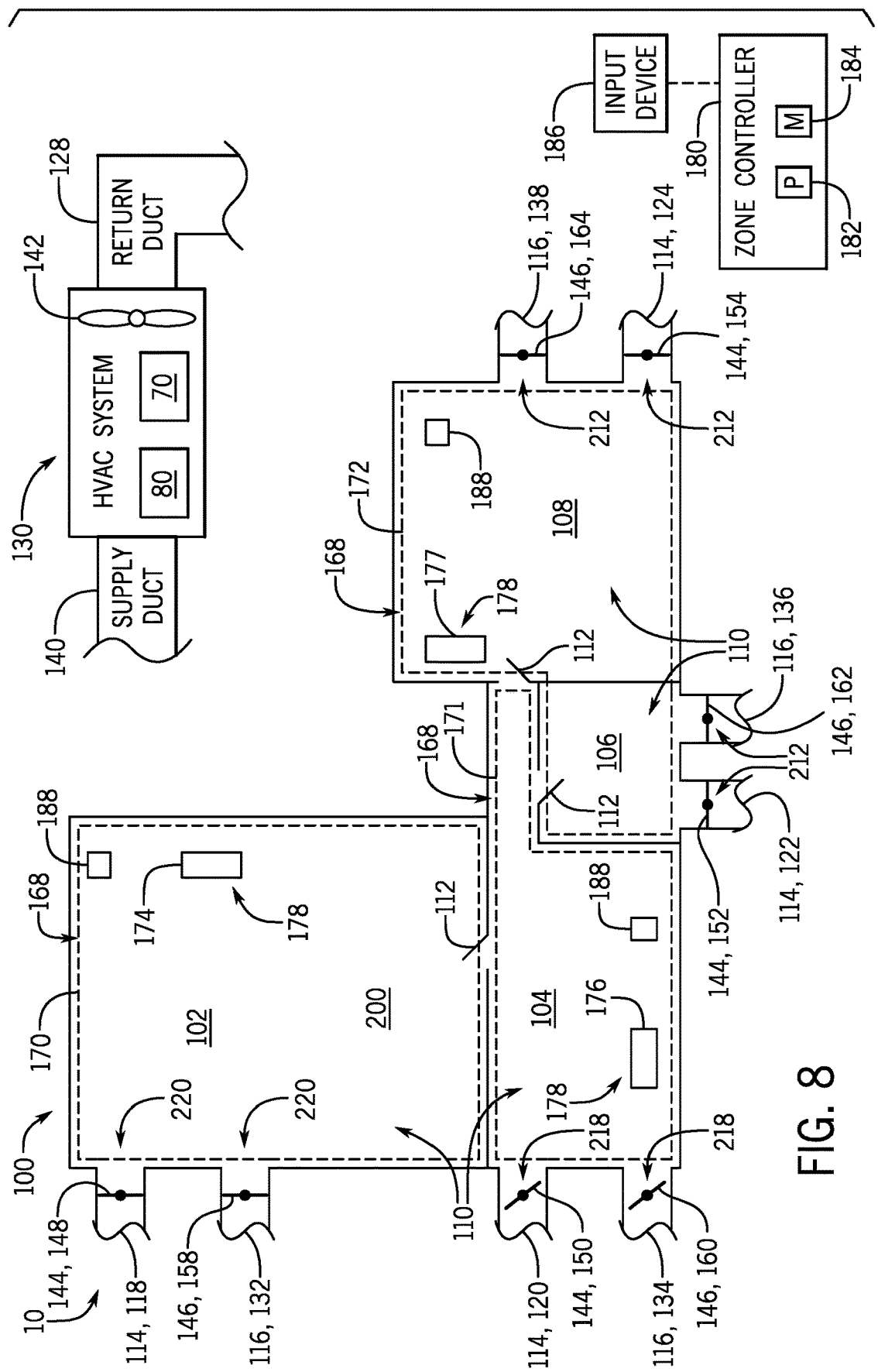
FIG. 8 is a schematic diagram of an embodiment of the zoning system in a charged state, in accordance with an aspect of the present disclosure.

In any case, upon determining that the thermal storage zone 200 acquires a full thermal charge, or a acquires a designated thermal charge, the zone controller 180 may transition the first return air damper 148 and the first supply air damper 158 to respective closed positions 220, as shown in FIG. 8. Accordingly, the first return air damper 148 and the first supply air damper 158 may mitigate leakage of conditioned air from the thermal storage zone 200 to other zones 168 of the building 10, thereby facilitating maintenance of the thermal charge within the thermal storage zone 200. For clarity, it should be noted that the designated thermal charge may be indicative of a thermal charge of the thermal storage zone 200 that is less than the full thermal charge of the thermal storage zone 200. For example, in embodiments where the HVAC system 130 is operating in the cooling mode, the thermal storage zone 200 may acquire the designated thermal charge when a temperature within the thermal storage zone 200 falls below a designated target temperature by a threshold amount, where the designated target temperature is greater than the target temperature associated with a full thermal charge of the thermal storage zone 200. Conversely, in embodiments where the HVAC system 130 is operating in the heating mode, the thermal storage zone 200 may acquire the designated thermal charge when a temperature within the thermal storage zone 200 exceeds a designated target temperature by a threshold amount, where the designated target temperature is less than the target temperature associated with a full thermal charge of the thermal storage zone 200.

In certain embodiments, an air temperature within the thermal storage zone 200 may gradually deviate from the target temperature corresponding to a full thermal charge or the designated thermal charge within the thermal storage zone 200. For example, some conditioned air may leak from the thermal storage zone 200 into adjacent zones 168 of the building 10, or thermal energy within the thermal storage zone 200 may be transferred to objects disposed within the thermal storage zone 200. If the air temperature within the thermal storage zone 200 deviates from the target temperature corresponding to a full thermal charge within the thermal storage zone 200 by a threshold amount, and the off-peak hours have not lapsed, the zone controller 180 may instruct the HVAC system 130 to recondition or recharge the air within the thermal storage zone 200. That is, the zone controller 180 may instruct the first return air damper 148 and the first supply air damper 158 to transition to the respective fully open positions 210, such that the HVAC system 130 may condition the air within the thermal storage zone 200 to ensure that an actual air temperature within the thermal storage zone 200 remains substantially similar to the target air temperature indicative of a full thermal charge within the thermal storage zone 200.

If the off-peak hours have not lapsed and one or more of the zones 168 are calling for heating or cooling, the HVAC system 130 may continue to condition and supply air to these zones 168. For example, as shown in the illustrated embodiment of FIG. 8, the zone controller 180 instructs the HVAC system 130 to supply conditioned air to the second zone 171 via the second supply air damper 160, which is disposed in the respective partially open position 218. If the thermal storage zone 200 is thermally charged and no remaining zones 168 of the building 10 are calling from heating or cooling, the zone controller 180 may instruct the HVAC system 130 to temporarily deactivate or suspend operation.

The zone controller 180 continues to monitor a heating demand or cooling demand of each of the zones 168, as well as whether the previously determined off-peak hours have lapsed. If no zones 168 of the building 10 call for heating or cooling and the off-peak hours have lapsed, the zone controller 180 temporarily suspend operation of the HVAC system 130 and continue to monitor whether a call for heating or cooling is received. That is, the zoning system 100 may maintain the first return air damper 148 and the first supply air damper 158 in respective closed positions while within the peak load hours or, in other words, while within a second designated time period. If a zone of the building 10 calls for heating or cooling and the off-peak hours have lapsed, the zone controller 180 may operate the zoning system 100 in a discharging mode to transfer previously conditioned air from the thermal storage zone 200 to the zone 168 calling for heating or cooling. That is, the zone controller 180 operates the zoning system 100 in the discharging mode during the peak load hours, or while within the second designated time period, after determining that the off-peak hours have lapsed. Accordingly, the zone controller 180 may supply conditioned air to the zone(s) 168 calling for heating or cooling without activating air conditioning components of the HVAC system 130, such as the compressor 74 or the furnace system 70. Indeed, when compressor 74 is not operating, electricity usage of the HVAC system 130 is reduced. Similarly, when the furnace system 70 is not operating, gas or fuel usage of the HVAC system 130 is reduced. Thus, when the zoning system 100 operates to condition a space within the building 10 utilizing the previously-conditioned air within the thermal storage zone 200, the zoning system 100 mitigates costly air conditioning operations of the HVAC system 130, such as during inopportune operational periods, including the peak load hours, thereby enhancing an operational efficiency of the HVAC system 130.

Figure 9:
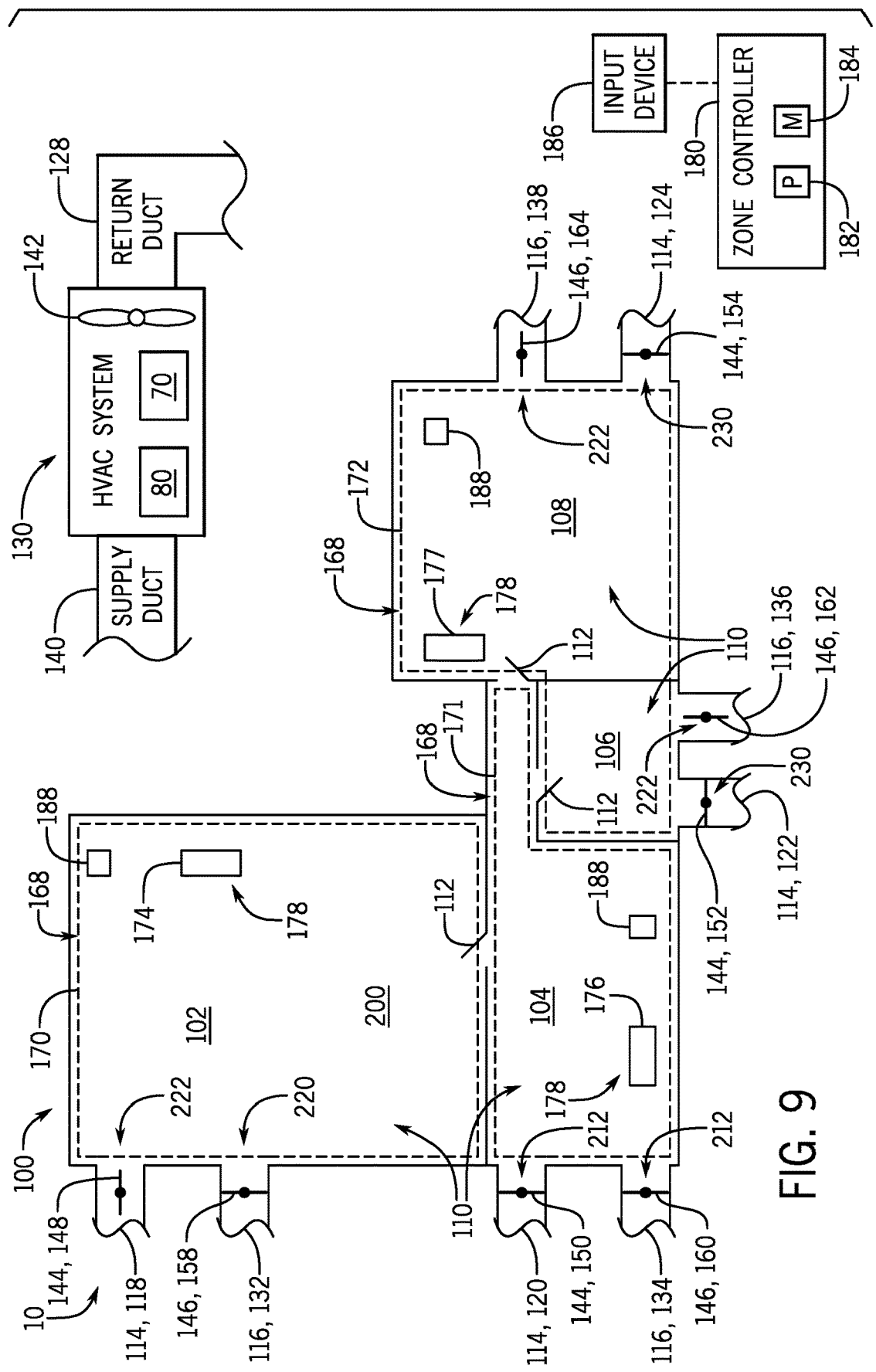
FIG. 9 is a schematic diagram of an embodiment of the zoning system operating in a discharging mode, in accordance with an aspect of the present disclosure.

With the foregoing in mind, FIG. 9 is a schematic of an embodiment of the zoning system 100 operating in the discharging mode. For sake of example, the third zone 172 is calling for cooling in the illustrated embodiment. In such an example, the zone controller 180 instructs the zoning system 100 to thermally discharge the thermal storage zone 200 to supply conditioned air to the third zone 172. To thermally discharge the thermal storage zone 200, the zone controller 180 instructs the first return air damper 148 and the third and fourth supply air dampers 162 and 164 to transition to respective open positions 222, while the remaining return and supply air dampers 144 and 146 of the zoning system 100 remain closed. Accordingly, the fans 142 of the HVAC system 130 and/or the auxiliary fans within the first return air duct 118, the third supply air duct 136, and/or the fourth supply air duct 138 may cooperate to transfer conditioned air from the thermal storage zone 200 to the third zone 172. That is, the fans 142 and/or the auxiliary fans may draw conditioned air from the thermal storage zone 200 into the first return air duct 118, direct the conditioned air through the HVAC system 130, and discharge the conditioned air to the third zone 172 via the third and fourth supply air ducts 136 and 138, thereby cooling the third zone 172.

In some embodiments, the compressor 74 and/or the evaporator 80 of the HVAC system 130 remain deactivated during the discharging mode of the zoning system 100. Accordingly, air traversing the HVAC system 130 from the thermal storage zone 200 to the third zone 172 is not conditioned by the evaporator 80 of the HVAC system 130. That is, the zoning system 100 enables the HVAC system 130 to condition the third zone 172 via the pre-conditioned air extracted from the thermal storage zone 200 without involving further air conditioning operations via the HVAC system 130. However, it should be noted that, in other embodiments, the compressors 74 and/or the evaporator 80 may indeed be operational in the discharging mode of the zoning system 100 to further condition the air traversing from the thermal storage zone 200 to the third zone 172.

Figure 10:
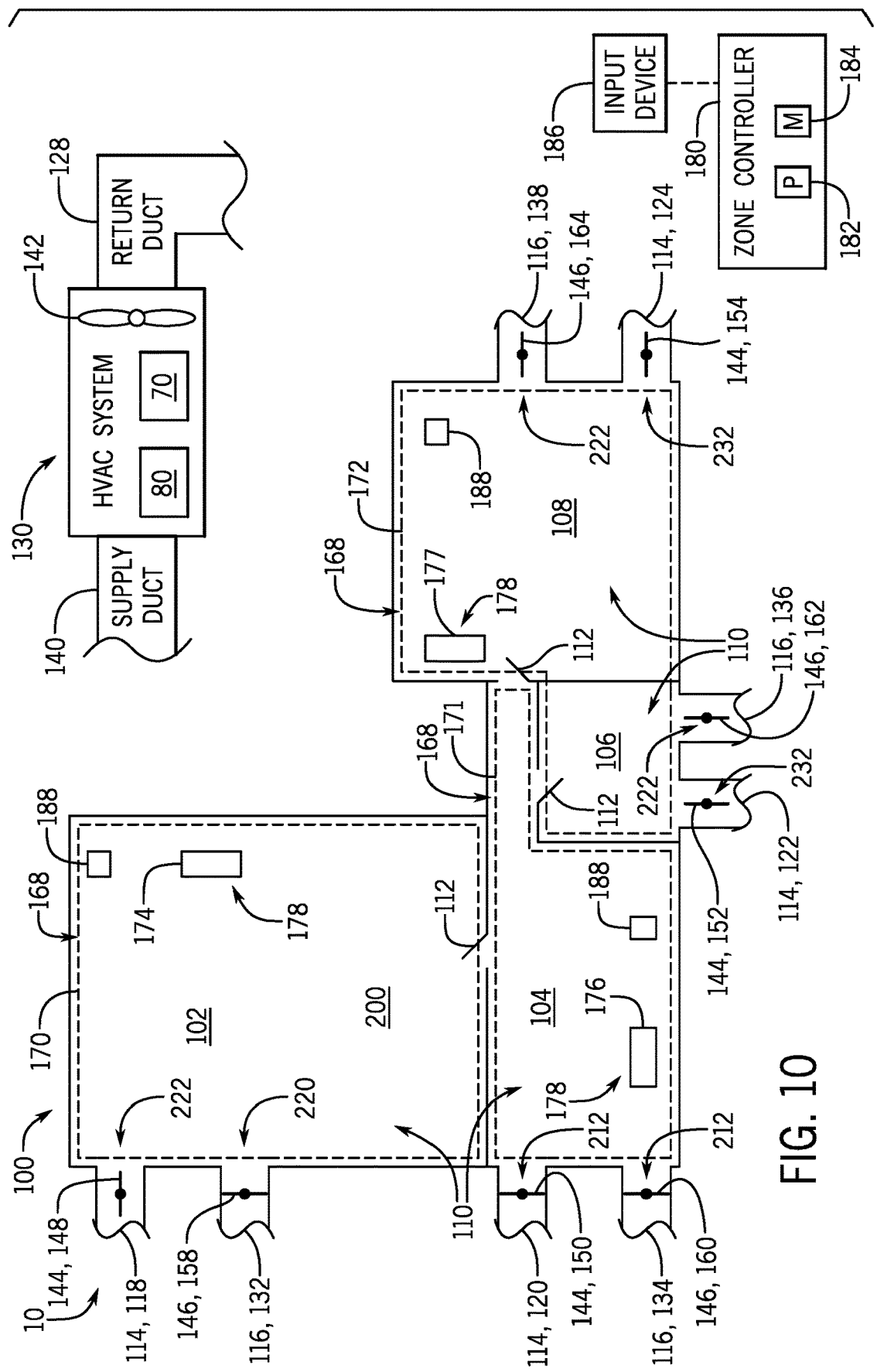
FIG. 10 is the schematic diagram of an embodiment of the zoning system operating in a discharging mode, in accordance with an aspect of the present disclosure.

In some embodiments, the zone controller 180 instructs the third return air damper 152 and the fourth return air damper 154 to remain disposed in respective closed positions 230 during initial operation of the zoning system 100 in the discharging mode. Accordingly, warm air within the third zone 172 may not be drawn into the HVAC system 130 via the third return air duct 122 and/or the fourth return air duct 124. In certain embodiments, the zone controller 180 instructs the third and fourth return air dampers 152 and 154 to transition to respective open positions 232, as shown in FIG. 10, upon determining that the pre-conditioned air supplied by the thermal storage zone 200 decreases an air temperature within the third zone 172 below a threshold temperature. The zone controller 180 may subsequently instruct the HVAC system 130 to activate the compressor 74 and/or the evaporator 80, thereby enabling the evaporator 80 to condition the air drawn into the HVAC system 130 via the third return air duct 122 and the fourth return air duct 124. Accordingly, the HVAC system 130 may circulate air between the evaporator 80 and the third zone 172.

The zone controller 180 may monitor an air temperature within the thermal storage zone 200, such as via the first control device 174, to determine when the thermal storage zone 200 is thermally discharged. For example, the thermal storage zone 200 may be thermally discharged when a temperature within the thermal storage zone 200 decreases below a previously selected target temperature by a threshold amount. In other embodiments, the zone controller 180 may determine that the thermal storage zone 200 is thermally discharged when an air temperature within the thermal storage zone 200 is within a threshold range of an air temperature within a zone calling for heating or cooling, such as the third zone 172. For example, the zone controller 180 may determine that the thermal storage zone 200 is thermally discharged when the air temperature within the thermal storage zone 200 is within about 0.05 degrees Celsius, 0.5 degrees Celsius, 1 degree Celsius, or within about 5 degrees Celsius of the air temperature with the third zone 172.

Upon determining that the thermal storage zone 200 is thermally discharged, the zone controller 180 may resume normal operation of the zoning system 100, as discussed above with reference to FIG. 5. That is, the zone controller 180 may instruct the HVAC system 130 to condition air via the evaporator 80 or the furnace system 70 and supply the conditioned air to any of the zones 168 calling for heating or cooling. Although the zoning system 100 has been described as thermally discharging the first zone 170, which is the storage zone 200, to condition the third zone 172 in the embodiments of FIGS. 9 and 10 discussed above, it should be noted that the zoning system 100 may transfer conditioned air from the thermal storage zone 200 to any of the zones 168 calling for heating or cooling. Further, the zone controller 180 may operate the zoning system 100 to simultaneously transfer conditioned air from the thermal storage zone 200 to a plurality of zones 168 within the building 10, in accordance with the techniques discussed above.

In some embodiments, the zone controller 180 may operate the zoning system 100 to transfer air from certain zones 168 within the building 10 to other zones 168 of the building 10 without previously thermally charging any of the zones 168. For example, in certain embodiments, a location of the zones 168 within the building 10 may determine a rate at which the zones 168 are heated or cooled by the ambient environment. That is, zones within an interior of the building 10 may be heated or cooled at a slower rate than zones near an outer perimeter of the building 10. In some embodiments, if the zone controller 180 receives a call for cooling from a particular zone, the zone controller 180 may evaluate whether other zones 168 within the building 10 contain air that is of a suitable temperature to condition the zone 168 calling for cooling. For example, the zone controller 180 may evaluate whether other zones 168 in the building 10 contain air that is at a temperature below an air temperature within the zone 168 calling for cooling by a threshold amount. If one or more zones 168 of the building 10 contain air suitable to condition the zone calling for cooling, the zone controller 180 may instruct the zoning system 100 to transfer air from these zones 168 to the zone 168 calling for cooling in accordance with the techniques discussed above. In certain embodiments, the determination to transfer air from one zone 168 to another zone 168 may also be based on detections from the occupancy sensors 188. For example, the zone controller 180 may regulate operation of the zoning system 100 to transfer air from the second zone 171 to the third zone 172 if the second zone 171 has air suitable to condition the third zone 172 to or toward a desired temperature and if the occupancy sensor 188 of the second zone 171 determines that the second zone 171 is unoccupied. Accordingly, the zone controller 180 may condition certain warmer zones 168 by transferring air from cooler zones 168 within the building 10 to such warmer zones 168, such as when the cooler zones 168 are unoccupied.

Technical effects of the zoning system 100 include improved efficiency of the HVAC system 130 by reducing air conditioning operations of the HVAC system 130 during inopportune operational periods, during which an efficiency of the HVAC system 130 is reduced and/or an operational cost of the HVAC system 130 is elevated. More specifically, the zoning system 100 enables the HVAC system 130 to pre-run during opportune operational periods to store thermal energy within the thermal storage zone 200 in the form of conditioned air. The zoning system 100 enables the HVAC system 130 to retrieve the stored, previously-conditioned air from the thermal storage zone 200 during inopportune operational periods of the HVAC system 130, such that the HVAC system 130 may condition a zone during these inopportune operational periods via the previous conditioned air. That is, the HVAC system 130 may condition a zone calling for heating or cooling during these inopportune operational periods without involving air conditioning operations by the compressor 74, the evaporator 80, and/or the furnace system 70 of the HVAC system 130. Accordingly, the zoning system 100 may enhance an operational efficiency of the HVAC system 130 and reduce an operational cost of the HVAC system 130.

As discussed above, the aforementioned embodiments of the zoning system 100 may be used on the HVAC unit 12, the residential heating and cooling system 50, a rooftop unit, the HVAC system 130, or in any other suitable HVAC system. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A zoning system for climate control, comprising:
    a controller configured to:
        operate the zoning system to supply conditioned air to a first zone of a plurality of zones through a first supply air damper to thermally charge the first zone;
        close the first supply air damper of the first zone and open a second supply air damper of a second zone of the plurality of zones after the first zone is thermally charged;
        operate the zoning system to draw the conditioned air from the first zone and supply the conditioned air to the second zone through the second supply air damper;
        determine an occupancy within each zone of the plurality of zones based on feedback acquired from occupancy sensors disposed within the plurality of zones;
        select an unoccupied zone of the plurality of zones as the first zone prior to operating the zoning system to supply the conditioned air to the first zone to thermally charge the first zone; and
        determine a priority value of the unoccupied zone prior to selecting the unoccupied zone, wherein the priority value is based on a characteristic of the unoccupied zone related to thermal energy storage.

2. The zoning system of claim 1, wherein the controller is further configured to:
    open the first supply air damper and open a first return air damper of the first zone prior to operating the zoning system to supply the conditioned air to the first zone to thermally charge the first zone; and
    close the second supply air damper and close a second return air damper of the second zone prior to operating the zoning system to supply the conditioned air to the first zone to thermally charge the first zone.

3. The zoning system of claim 1, wherein the controller is configured to operate the zoning system to supply the conditioned air to the first zone to thermally charge the first zone while within a designated time, wherein the designated time is selected based on electricity cost, weather forecast data, historical weather data, a time of day, historical occupancy data of the first zone, or a combination thereof.

4. The zoning system of claim 1, wherein the controller is configured to operate the zoning system to draw the conditioned air from the first zone and supply the conditioned air to the second zone through the second supply air damper while within a designated time, wherein the designated time is selected based on electricity cost, weather forecast data, historical weather data, a time of day, historical occupancy data of the first zone, or a combination thereof.

5. The zoning system of claim 1, wherein the controller is configured to operate the zoning system to draw the conditioned air from the first zone at a designated time and supply the conditioned air to the second zone to condition the second zone without activating a compressor or a furnace system of the zoning system.

6. The zoning system of claim 1, wherein the zoning system comprises an input device communicatively coupled to the controller and configured to enable an occupant to designate the unoccupied zone as the first zone prior to the controller operating the zoning system to supply the conditioned air to the first zone to thermally charge the first zone.

7. A zoning system for climate control, comprising:
a controller configured to:
operate the zoning system while within a first designated time to supply conditioned air through a first supply air damper of a first zone of a plurality of zones to thermally charge the first zone;
close the first supply air damper and close a first return air damper of the first zone to store the conditioned air within the first zone after a determination that the first zone has a designated thermal charge, wherein the first zone is determined to have the designated thermal charge when an air temperature within the first zone is within a threshold range of a target temperature;
open the first return air damper and open a second supply air damper of a second zone of the plurality of zones while within a second designated time subsequent to the first designated time; and
operate the zoning system to draw the conditioned air through the first return air damper of the first zone and supply the conditioned air to the second zone through the second supply air damper.

8. The zoning system of claim 7, wherein the controller is configured to open the first supply air damper of the first zone, open the first return air damper of the first zone, close the second supply air damper of the second zone, and close a second return air damper of the second zone prior to operating the zoning system while within the first designated time to thermally charge the first zone.

9. The zoning system of claim 7, wherein the controller is configured to:
determine whether the first designated time has lapsed prior to the determination that the first zone has the designated thermal charge; and
close the first supply air damper and close the first return air damper of the first zone in response to a determination that the first designated time has lapsed.

10. The zoning system of claim 7, wherein the controller is communicatively coupled to a control device configured to provide the controller with feedback indicative of the air temperature within the first zone.

11. The zoning system of claim 7, wherein the controller is configured to select the first designated time and the second designated time based on electricity cost, weather forecast data, historical weather data, a time of day, historical occupancy data of the building, or a combination thereof.

12. The zoning system of claim 7, wherein the controller is communicatively coupled to a position sensor associated with a door of the first zone, and wherein controller is configured to prevent operation of the zoning system while within the first designated time to thermally charge the first zone in response to feedback from the position sensor indicative of the door in an open position.

13. The zoning system of claim 7, wherein the controller is configured to select a zone of the plurality of zones as the first zone prior to operating the zoning system to supply the conditioned air to the first zone, wherein the zone is selected as the first zone based on an operating mode of the zoning system, occupancy data of each zone of the plurality of zones, physical parameters of each zone of the plurality of zones, or a combination thereof.

14. A heating, ventilation, and/or air conditioning (HVAC) system, comprising:
a zoning system configured to control the HVAC system to condition spaces within a building having a plurality of zones, wherein the zoning system has a controller configured to:
open a first damper and a second damper of a first zone of the plurality of zones while within a first designated time period;
operate the zoning system to supply conditioned air to the first zone through the first damper to thermally charge the first zone while within the first designated time period;
open a third damper of a second zone of the plurality of zones while within a second designated time period and after the first designated time period;
operate the zoning system while within the second designated time period to draw the conditioned air from the first zone through the first damper or the second damper to thermally discharge the first zone and to supply the conditioned air to the second zone through the third damper to condition the second zone; and
close the first damper and close the second damper of the first zone prior to opening the third damper of the second zone while within the second designated time period in response to:
determining that the first designated time period has lapsed and no zone of the plurality of zones is calling for conditioned air at initiation of the second designated time period.

15. The HVAC system of claim 14, wherein the controller is configured to select the first designated time period and the second designated time period based on electricity cost, weather forecast data, historical weather data, a time of day, historical occupancy data of the building, or a combination thereof.

16. The HVAC system of claim 14, wherein the controller is configured to select a zone of the plurality of zones as the first zone prior to opening the first damper and the second damper of the first zone while within the first designated time period, wherein the zone is selected based on an operating parameter of the zoning system.

17. The HVAC system of claim 16, wherein the operating parameter comprises occupancy data of each zone of the plurality of zones, physical parameters of each zone of the plurality of zones, an operational mode of the zoning system, or a combination thereof.

18. The HVAC system of claim 14, wherein the zoning system comprises a position sensor configured to provide the controller with feedback indicative of a position of a door or a window of the first zone.

19. The HVAC system of claim 18, wherein the controller is configured to:

determine whether the door or the window of the first zone is disposed in an open position prior to operating the zoning system to supply conditioned air to the first zone while within the first designated time period; and inhibit thermal charging of the first zone in response to determining that the door or the window of the first zone is disposed in the open position.

20. The HVAC system of claim 14, wherein the zoning system is configured to draw the conditioned air from the first zone while within the second designated time period and to supply the conditioned air to the second zone to condition the second zone without activating a compressor or a furnace system of the zoning system.

21. A heating, ventilation, and/or air conditioning (HVAC) system, comprising:
   a zoning system configured to control the HVAC system to condition a space within a building having a plurality of zones, wherein the zoning system comprises a controller configured to:
      open a first damper and a second damper of a first zone of the plurality of zones while within a first designated time period;

operate the zoning system to supply conditioned air to the first zone through the first damper to thermally charge the first zone while within the first designated time period;
      open a third damper of a second zone of the plurality of zones while within a second designated time period that is after the first designated time period;
      operate the zoning system while within the second designated time period to draw the conditioned air from the first zone through the first damper or the second damper to supply the conditioned air to the second zone through the third damper to condition the second zone; and
      close the first damper and close the second damper of the first zone prior to opening the third damper of the second zone while within the second designated time period in response to:
         determining that an air temperature within the first zone is within a threshold range of a target temperature indicative of a designated thermal charge within the first zone.

\* \* \* \* \*